Sept. 10, 1929.  W. D. ARCHEA  1,727,424
MILLING MACHINE
Filed June 16, 1926   3 Sheets-Sheet 1
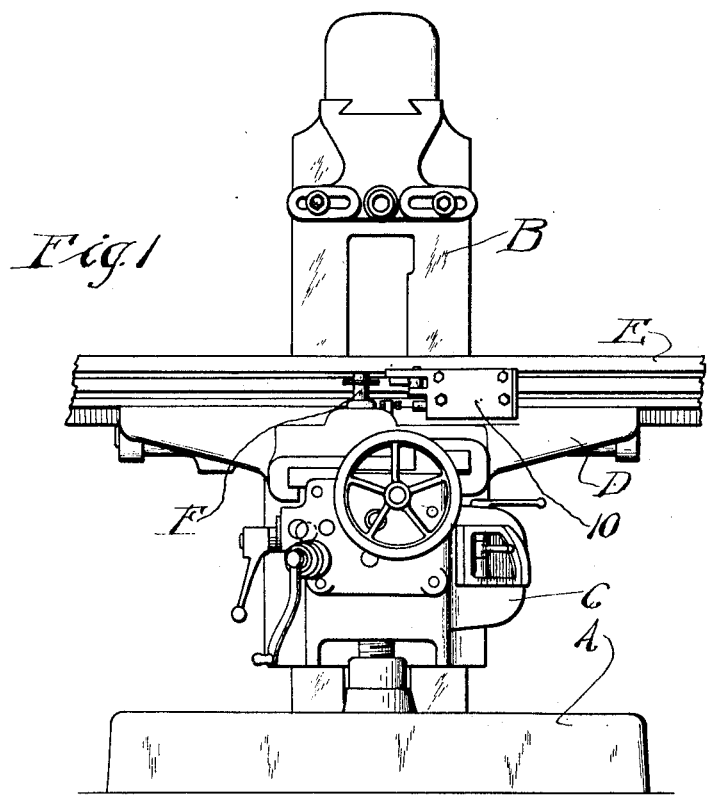
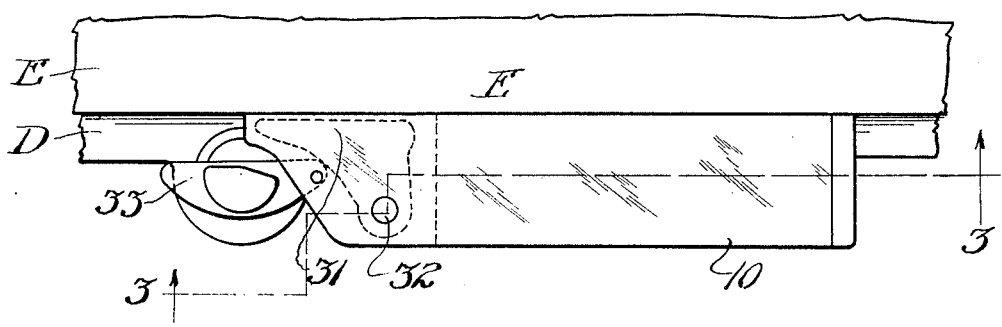

Sept. 10, 1929.  W. D. ARCHEA  1,727,424
MILLING MACHINE
Filed June 16, 1926   3 Sheets-Sheet 2
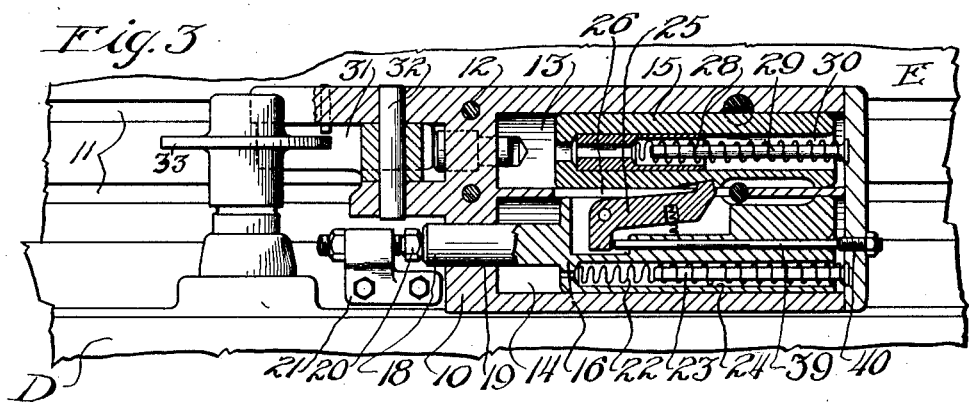
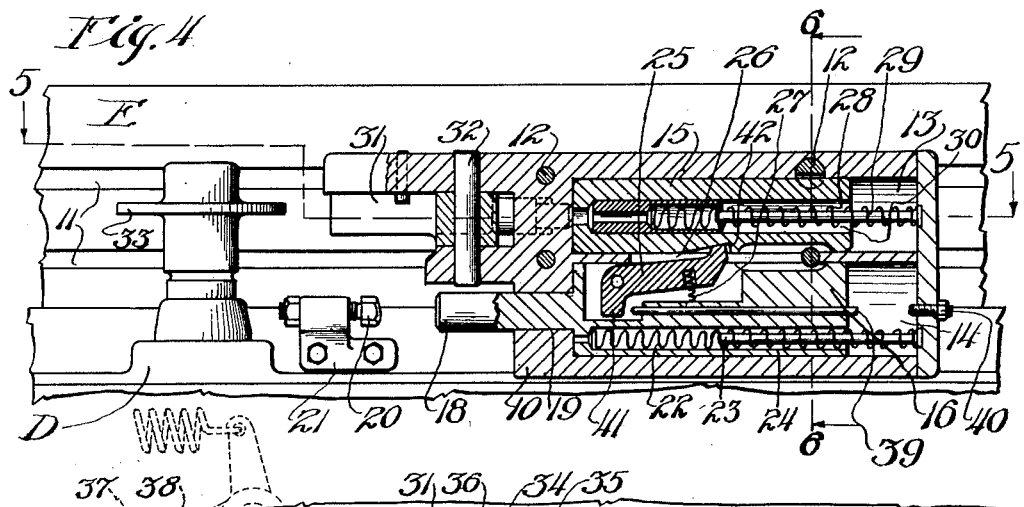
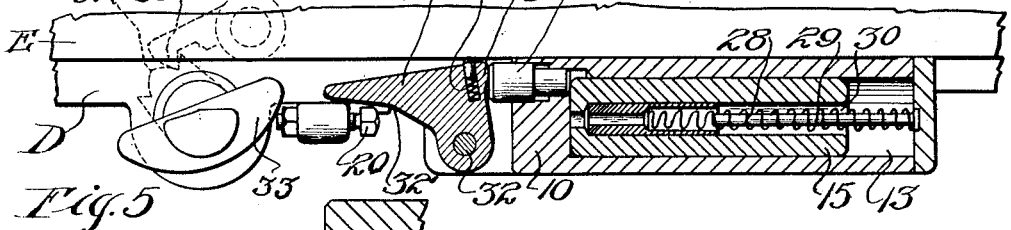
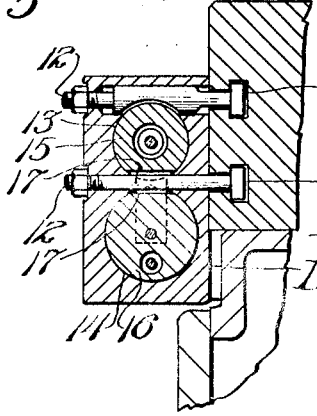
Inventor
Walter D. Archea
By A. H. Parsons
Attorney Sept. 10, 1929.   W. D. ARCHEA   1,727,424
MILLING MACHINE
Filed June 16, 1926   3 Sheets-Sheet 3
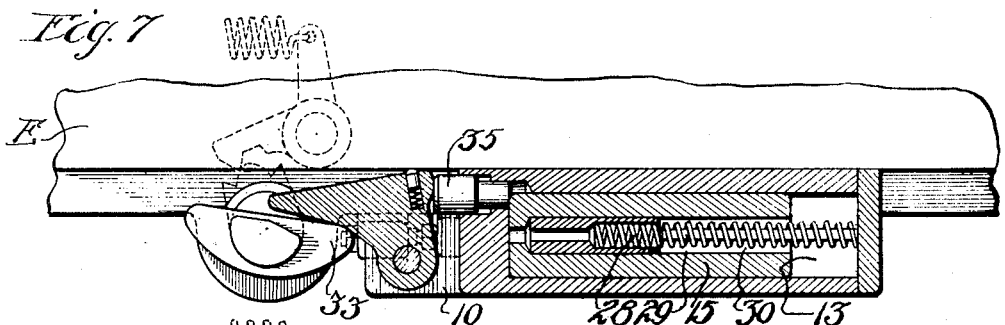
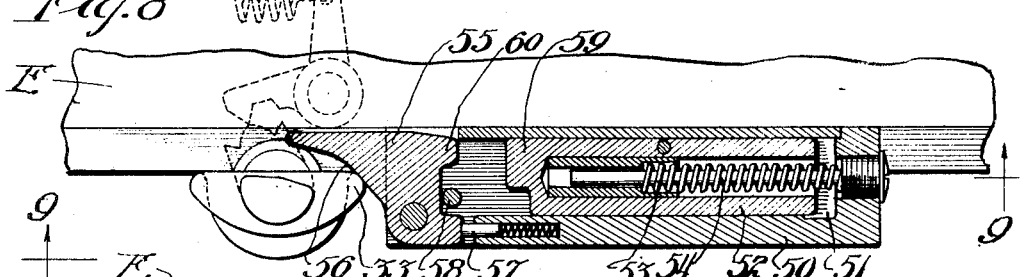
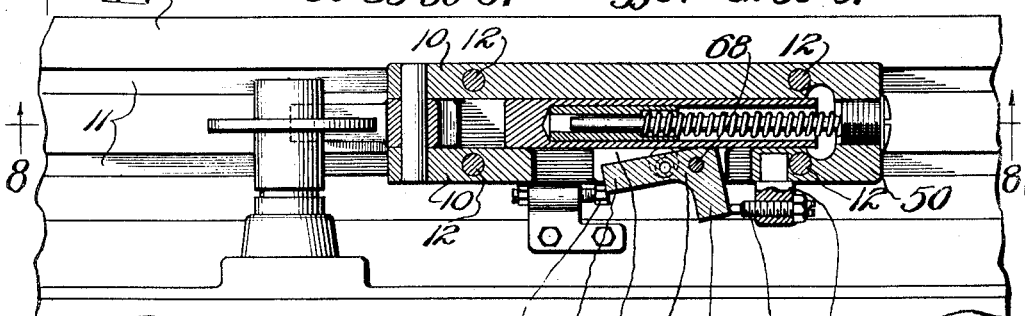
Inventor
Walter D. Archea
By
OHK Parsons
Attorney Patented Sept. 10, 1929.

1,727,424

UNITED STATES PATENT OFFICE.

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO.

MILLING MACHINE.

Application filed June 16, 1926. Serial No. 116,455.

This invention relates to improvements in milling machines and has particular reference to a novel and improved mechanism for controlling the actuation of such machines.

Prior to the present invention it has been customary in machine tools such as milling machines for example to make use of dog controlled devices for reversing, stopping or otherwise regulating the movements of the machine. A very satisfactory mechanism for this purpose is illustrated for example, in patent to Hazelton, No. 1,390,706. In this patent the reversal of movement of the table for example, is accomplished by a dog actuated trip, moved by the dog to a certain position and then snapped to the opposite position by coaction of interengaging spring pressed cam and plunger surfaces. While entirely satisfactory for normal operations, present day precision requirements in some lines of manufacture, make it desirable that an even more positive means be designed for controlling the shifting of the parts.

It is therefore the primary object of the present invention to provide an actuating mechanism for a machine tool control, which may be employed either in place of, or in addition to mechanism such as shown in the Hazelton patent above referred to, and which must positively automatically insure desired movement of the trip at a precisely determined position within a fractional thousandth of an inch.

A further object of the invention is the provision of a novel and improved self-contained trip actuating unit which may be readily applied to a machine tool in place of the ordinary control dog and which will positively actuate and shift a trip mechanism at a predetermined point.

Another object of the invention is the provision of an improved load and fire trip actuating mechanism which may be applied as a supplemental entity to a machine tool for predetermined precision actuation of the trip control element thereof.

Other objects and advantages of the present invention should be readily apparent by reference to the following specification taken in connection with the accompanying drawings, and it will be understood that I may make any modifications in the specific structural details hereinafter illustrated, within the scope of the appended claims, without departing from or exceeding the spirit of the invention.

Figure 1 is a front elevation of a milling machine, with my device applied thereto.

Figure 2 is an enlarged fragmentary plan view.

Figure 3 is a vertical sectional view as on the line 3—3 of Figure 2, with the parts in firing position.

Figure 4 is a similar view, but with the parts in normally occupied position.

Figure 5 is a horizontal sectional view on the line 5—5 of Figure 4.

Figure 6 is a vertical section on the line 6—6 of Figure 4.

Figure 7 is a horizontal sectional view of a modified form of the invention.

Figure 8 is a similar view of the parts before firing, and Figure 9 is a vertical sectional view of this embodiment.

In the drawings the letter A designates the bed of a milling machine having the column B supporting the knee C and saddle D. Mounted on saddle D for longitudinal sliding movement is the table E, suitably power actuated for reciprocation thereof, and having its direction of movement and starting or stopping thereof controlled as by the conventional oscillatable and axially shiftable trip member F. The mechanism just referred to is of conventional type, as shown and specifically claimed for example, in Hazelton Patent No. 1,390,706.

With the present day requirements for accuracy of automatic machines to limits of less than a thousandth of an inch, it is necessary that extremely accurate controls for such machines be provided. For this reason the ordinary type of trip dog carried by a movable table or like part is not entirely sufficient. To overcome these difficulties, I have designed the improved load and fire mechanism here illustrated. This comprises a main frame or casing 10, secured to the T slots 11 at the front of the table E, by means of the clamp bolts 12. In the form of invention shown in Figures 1 to 6, the casing 10 is formed with the cylindrical chambers 13 and 14, containing the piston members 15 and 16 respectively. These piston members are flattened off as at the point 17 and the lower clamp bolt 12 serves in addition as a key member holding them against rotation, while permitting of their longitudinal sliding movement within their respective cylinders.

Piston 16 has integral therewith stud 18 slidable in, and projecting through an aperture 19 in the casing 10, and adapted to contact with the adjustable stop bolt 20 carried by a bracket 21 on the saddle D. A spring 22 guided by rod 23 and compressible within spring chamber 24 of piston 16, serves to normally hold the piston forced toward the left as shown in Figure 4 and with lug 18 in projecting position. This piston is provided with a spring pressed pawl member 25 outwardly urged through slot 26 intermediate piston chambers 13 and 14 as by action of spring 27. Piston 15 is formed on its underside with a keeper recess 42 adapted to receive the projected end of pawl 25 and interlock with, whereby the two pistons may be caused to move together in unison. Compression spring 28 coiled on guide 29 fits within axial chamber 30 of piston 15, tending to forcibly shift the piston to the left as shown in Figures 4 and 5 of the drawings.

Pivoted to the upper portion of the casing 10 is the triangular trip actuator 31 oscillatable about pivot pin 32, disposed at the forward portion of casing 10. This member has a cam edge 32' for sliding engagement with the adjacent wing 33 of trip F, in the same manner that this wing is normally engaged and shifted by a table dog. This actuator 31 has an anvil portion 34 engaged by firing pin 35, loosely slidable in the casing 10 and outwardly actuated by engagement of the end of plunger 15 with the rear of said pin, as indicated in Figure 5.

In operation we may consider the table E as moving toward the left, and the trip F so set as to reverse movement of the table on reverse oscillation of the trip. As the table and attached control device move toward the left, lug 18 will be brought into contact with the adjustable stop screw 20 carried by the saddle. Continued movement of the table will shift piston 16 to the right. This movement on account of the interlocking engagement of pawl 25 and the keeper recess of piston 15, will carry piston 15 also to the right, compressing actuating spring 28, the parts then occupying substantially the position indicated in Figure 3 of the drawings and the actuator 31. As the parts are thus shifted, pressure against pin 35 will be released and the combined action plunger spring 36 and the interengagement of the end of the actuator with the adjacent wing of the trip will first swing the actuator into a position with its one side parallel with the table as indicated in Figure 2, after which the interengagement of its cam surface with the trip wing will initiate a rotary movement of the trip, as shown in said figure.

The trip is provided with the cam 37 engaged by the spring actuated pawl or plunger 38, which will tend when the trip is swung past the center point on the cam, to reversely rotate the trip. This, however, is not an absolutely positively timed method of producing the result in question. To make the action more positive, at a most accurately predetermined point, the piston 16 has slidably mounted therein the release rod 39, whose movement toward the right is limited by engagement with the end of the adjustable screw 40, secured in the end wall of casing 10. Consequently, with the parts approaching the position shown in Figure 3 of the drawings, as release rod 39 strikes pin 40 its further movement with the piston is prevented and if there be further movement of the piston on account of interengagement of its lug 18 with the adjustable stop 20 on the saddle, the movement of the rod will be relative to the piston. Its other end projects into engagement with depending arm 41 of trigger pawl 25, so that the continued movement of piston 16 carrying the trigger pawl rearwardly with its depending arm engaged by the now stationary rod 39, will cause the pawl to swing, and at a predetermined point to disengage the striker piston 15. Immediately upon said disengagement, expansion of spring 28 will cause the striker piston 15 to forcibly engage pin 35, which in turn striking the anvil 34 on member 31 will swing said member about its pivot 32, instantaneously snapping the control trip about into its newly fixed position and eliminating any possible lag due to relative friction or sticking between parts 37 and 38, which might interfere with accuracy in the absence of a positive control device such as here employed. It will be understood that this movement of the trip will for example, reverse the table, when the control device will move away from the trip and the parts again assume the normal position indicated in Figure 4, but will be ready for subsequent compression and positive trip actuation on return movement. It will also be understood that while but a single device has been shown as all that is necessary for proper understanding of the invention, that in ordinary commercial practice a second device may be placed at the opposite side of the trip for reversely actuating same when it is desired that there be a continuous back and forth reciprocation of the work table or when one trip is desired to reverse the direction of movement of the table and a second mechanism to subsequently stop the movement of the table.

A somewhat simpler form of the invention has been shown in Figures 7, 8 and 9 of the drawings, in which use is made of a casing 50, having a single piston chamber 51 of rectangular form for the contained slide 52 actuated, toward the left as by compression spring 53 on guide rod 54. Pivoted to this casing 50 is the trip actuator 55 having cam portion 56 cooperating with the lateral wing 33 of the trip and steadied in position as by the spring actuated plunger 57, its swinging movement being limited by pin 58 as will be evident from Figure 8. In this instance piston member 52 has a hammer portion 59 for engaging anvil 60 of the actuator. It is also provided with the bracket portion 61 on which is pivoted the L shaped control trigger 62, having one arm 63 adapted to contact with the stop screw 64 carried by the saddle and having the second releasing arm 65 for engagement by the adjustable stop screw 66 carried by bracket 67 on casing 50.

In the operation of this form of the invention the movement of the table toward the left will cause end of arm 63 to interengage with stop screw 64, thus stopping the movement of the trigger member 62 and piston 52, while the movement of the contained casing 50 continues toward the left. This comprises actuating spring 53 as indicated in Figure 9 of the drawings. Continued movement of the table causes arm 65 of the trigger device to come into engagement with the moving release screw 66. It will be noted that this screw is disposed a greater distance below the pivot 68 for the release trigger 62, than is the stop screw 64, with the result that continued movement of the parts, through pressure of screw 66 against arm 65, will rock member 62 until its arm 63 slides out of engagement with the head of stop screw 64. This will release piston 52 and expansion of spring 53 will then cause hammer 59 to strike anvil 60, positively rocking the trip actuator 55 about its pivot, with the result that as in the form previously described, the trip is positively accurately shifted to cause the selected reversing or stopping of the table movement at a precisely predetermined point.

I claim:—

1. The combination with a machine tool, including a pair of relatively movable parts and a control trip for regulating said relative movement, of a positive actuating device for the trip, including a casing, a spring actuated hammer carried thereby, a trip actuator operable by the hammer, means actuated by relative movement of the parts for placing the hammer under tension, a control trigger for the hammer and means for shifting the trigger at a predetermined point, whereby the hammer is released to engage and operate the trip actuator.

2. A load and fire attachment for machine tools, including a containing casing, a plunger member slidable within the casing, spring actuating means for the plunger, means for automatically shifting the plunger to place said spring actuating means under tension, additional means for subsequently releasing the plunger and a trip actuator carried by the casing and operatively associated with the plunger to be shifted by the releasing thereof.

3. A trip controlling attachment for a machine tool, including a casing having a pair of chambers, plunger members slidably mounted within the chambers, spring means for actuating both plungers in a common direction, means for positively shifting one of said plungers against the action of its spring, a trigger device coupling the other plunger for movement with the first, an adjustable release device adapted to engage the trigger to release the second plunger, and a trip actuator operable by the released plunger.

4. A positive machine tool trip actuating mechanism including an oscillatable trip actuator, a power storing mechanism normally disengaged from the actuator, and means for releasing the power storing mechanism whereby the latter will suddenly and forcibly shift the actuator.

5. The combination with a machine tool including a pair of relatively reciprocable parts and a trip member for controlling such relative movement, of means for automatically shifting the trip including a power storing mechanism actuated by relative movement of the parts, a trip actuator disassociated with the power storing mechanism during the operation thereof, and means operable on definite relative movement of the parts for releasing the power storing mechanism suddenly and positively to engage and to shift the actuator to operate the trip.

6. Trip operating mechanism for application to a machine tool having a reversing trip comprising a casing or bracket member for adjustable application to the tool, a trip actuator positively secured to said casing and having a cam portion for engagement with the trip to actuate the trip as the member is advanced in the direction thereof, and supplemental means within the casing operable to oscillate the actuator, whereby the cam produced movement of the trip will be positively accelerated.

7. A control mechanism for a machine tool having a supporting member and a second member translatable thereon, comprising a trip carried by the stationary member for controlling the movement of the translatable member, a contact member disposed on the support in definite relation to the trip, and a trip actuating mechanism applicable to the translatory member including a bracket or casing portion, a trip actuator movably supported thereby and having a portion engageable with the trip for direct actuation of the trip as said actuator is moved by translation of its support, and additional means mounted in the casing and rendered effective by inter-engagement of the contact on the support therewith, for shifting the actuator relative to the casing whereby the movement of the trip is accelerated.

In testimony whereof I affix my signature.

WALTER D. ARCHEA.